(12) United States Patent
Kelly (10) Patent No.: US 6,442,595 B1
(45) Date of Patent: Aug. 27, 2002

(54) AUTOMATED ELECTRONIC DOCUMENT TRANSMISSION

(75) Inventor: Christopher T. Kelly, Marion, IA (US)

(73) Assignee: Circle Computer Resources, Inc., Cedar Rapids, IA (US)

( * ) Notice: Subject to any disclaimer, the term of this patent is extended or adjusted under 35 U.S.C. 154(b) by 0 days.

(21) Appl. No.: 09/470,027

(22) Filed: Dec. 22, 1999

Related U.S. Application Data (63) Continuation-in-part of application No. 09/120,753, filed on Jul. 22, 1998, now Pat. No. 6,092,104.

(51) Int. Cl.$^7$ .............................................. G06F 13/00
(52) U.S. Cl. ...................... 709/206; 709/321; 709/329
(58) Field of Search ................................ 709/203, 204, 709/206, 217, 313, 328, 329; 358/400, 402

(56) References Cited

U.S. PATENT DOCUMENTS

| | | | |
|---|---|---|---|
| 5,461,488 A | | 10/1995 | Witek |
| 5,499,108 A | * | 3/1996 | Cotte et al. .................. 358/400 |
| 5,861,958 A | | 1/1999 | Jamrog |
| 5,872,926 A | | 2/1999 | Levac et al. |
| 5,881,223 A | | 3/1999 | Toyoda et al. |
| 5,881,233 A | * | 3/1999 | Toyoda et al. ............... 709/233 |
| 6,025,931 A | * | 2/2000 | Bloomfield .................. 358/402 |
| 6,192,518 B1 | * | 2/2001 | Neal ............................ 717/11 |
| 6,208,638 B1 | | 3/2001 | Rieley et al. |

OTHER PUBLICATIONS

"German Pop Singer Sets Sights on Virtual Office,"NY Times, Sep. 23, 1996, Sreenath Sreenivasan.
"Universal In–Box: Internet Fax, Voice Mail Systems Links with Eudora E–mail Clients," Web Week, Jun. 23, 1997, Susan Moran.
"Two Faxing Packages Make Net Gains," PC Week, Nov. 13, 1996, Matt Kramer.
"3–Reproduced from The Voice on Net Home Page.txt", Nov. 13, 1995.
1996 e–mail–fax–list–txt from http://www.sunet.net/fax--faq.htm.
"Affinicast, ConXion, Virtual TCP Online, JFAX Communications, Solve Your Crosswords, dope.com . . . "NetWatch Services Page, May. 15, 1996.

* cited by examiner

*Primary Examiner*—Viet D. Vu (57) ABSTRACT

The invention according to a preferred embodiment provides a method for capturing electronic files from an electronic device and transmitting the electronic files to an address specified by a user. The method includes the steps of detecting output selection from the user; capturing the output using a driver; verifying the file format is compatible with the address using an interface; attaching one or more files to a message; displaying the message and allowing the message to be edited by the user, wherein editing includes specifying one or more addresses where the electronic file is to be sent; and sending the message. Optionally, the invention includes dialing and connecting to the Internet if necessary prior to sending the electronic file to the designated addresses. The message may include a cross-platform compatible machine language such as XML.

19 Claims, 7 Drawing Sheets

AUTOMATED ELECTRONIC DOCUMENT TRANSMISSION

CROSS REFERENCE TO RELATED APPLICATIONS

This application is a continuation-in-part application of application Ser. No. 09/120,753, filed Jul. 22, 1998 now U.S. Pat. No. 6,092,104. The disclosure thereof is incorporated herein by reference as if fully set forth herein.

BACKGROUND OF THE INVENTION

I. Field of the Invention

The present invention relates in general to methods for electronic document transmission. More particularly, it relates to the sending and receiving of documents in various electronic formats, the automated sending and receiving of electronic documents in various formats, and in particular to a method for preparing and sending a facsimile or other electronic document from a computer application software program by utilizing a combination of a driver for generating a file output (e.g. a video file, audio file, facsimile or other graphic images) and an electronic mail client for transmitting the files via electronic mail or other means to selected recipients. The use of XML machine language allows the cross-platform utilization of the invention.

II. Description of the Prior Art

Various techniques are known for transmitting documents to a remote location. These techniques include the use of conventional facsimile machines, facsimile modems, and electronic mail transmissions. When transmitting facsimiles using a conventional facsimile machine, one ordinarily performs the steps of: obtaining a hard copy document with images on it, physically taking the hard copy to a conventional fax machine, inserting the document in the input tray, dialing the telephone number of the receiving fax machine, and pressing a "start" button on the fax machine to begin transmission of the document.

When using a fax modem to transmit a document, one ordinarily performs the steps of: "printing" a document by selecting a "fax" printer from a list of printer drivers, entering or selecting the phone number of the receiving fax machine or fax modem, and sending the document.

When using e-mail, one ordinarily performs the steps of: inserting a document into an e-mail program, or attaching a document to an e-mail message, entering or electing one or more addressees, and sending the document. These techniques have been effective means for business and personal communications. However, there are problems and limitations associated with using traditional fax machines, fax modem, and e-mailing with attachments. For example, word processing documents may contain macros that can potentially contain viruses. Furthermore, it has hitherto been difficult to shift from one transmission means to another readily.

With respect to conventional fax machines, one may be required to wait in line to use the fax machine, wait for an open telephone line if the telephone system is overloaded, clear paper jams which commonly occur when sending more than one page, and wait for retransmission attempts after "busy" signals are encountered.

The limitations of conventional fax machines include their inability to transmit color images and their limited availability in homes. Color facsimile machines are available, but are generally expensive and can transmit in color only to other color facsimile machines. In addition to these potential problems associated with using conventional fax machines, one ordinarily must pay telecommunication charges for long distance connections.

Also, images are often garbled or otherwise corrupted in transmission by telephone line problems or paper jams by the receiving fax machine.

Problems associated with using fax modems include waiting for an open telephone line if the phone system is overloaded, and waiting for retransmission after "busy" signals. The limitations of fax modems include their inability to transmit color images, and their limited availability in homes. Like conventional fax machines, there are telecommunication charges for long distance connections when using a fax modem. Also images are often garbled or otherwise corrupted in transmission by telephone line problems or paper jams by the receiving fax machine.

With regard to the usage of e-mail with graphical attachments, one ordinarily must perform the manual-labor-intensive steps of generating a document in an application software program, saving the document, activating an e-mail application program, attaching the document to an e-mail message, and sending the e-mail message to recipients. At the receiving end, there is the possibility that the recipient does not having proper software for viewing the attachment or does not having compatible operating environment.

Similarly, video clips, audio clips, or other data files may be attached to email messages, but the process is frequently time consuming and if the ultimate destination for the file is not compatible with the file format, receipt of the data file may never occur.

Furthermore, if one desires to send multiple messages, in different formats, it is difficult to switch from program to program in order to effectuate sending. With memory limitations and the large size of graphical files, opening several different programs and the associated documents may cause computer systems with limited resources to "crash" with a concomitant loss of productivity.

A solution to these drawbacks is needed.

SUMMARY OF THE INVENTION

In view of the above, it is the broad object of the present invention to provide an improved method for transmitting electronic documents in various formats. "Document" or "image" as used herein should be construed broadly, as referring not only to traditional electronic documents such as word processing documents, e.g. text, quotes, invoices, or reports, but also images (moving or still), audio files, blueprints or CAD renderings, forms and data in varied formats and outputs.

The invention according to a preferred embodiment provides a method for capturing print or output images from any of a variety of computer application software programs and transmitting the images to an e-mail address, fax location, personal digital assistant (PDA), pager, cell phone, an audio, video, or presentation output, or other destination specified by a user.

The invention according to another preferred embodiment provides a method for capturing print or output images from computer application software programs and transmitting the images to a selected electronic document destination.

The method includes the steps of detecting the custom printer driver selection from the user, capturing the document using the custom printer driver, converting one or more pages of the file or document into one or more images or file structures; attaching one or more images to an e-mail message or other transmission means; displaying the message and allowing the message to be edited by the user, wherein editing includes specifying one or more addresses where the document is to be sent; adding a subject and message body; and sending the e-mail message, and, optionally dialing and connecting to the Internet if necessary, prior to sending the document to the designated e-mail addresses.

Additionally, the method includes the automated addition of recipients to a message, in a variety of recipient format types. A user can add various fax or email recipients and have the appropriate format document delivered to the correct destination.

Upon further study of the specification and appended claims, further objects and advantages of this invention will become apparent to those skilled in the art.

BRIEF DESCRIPTION OF THE DRAWINGS

The foregoing and other objects, features, and advantages of the invention will be apparent from the following more particular description of preferred embodiments as illustrated in the accompanying drawings, in which reference character refer to the same parts throughout the various views. The drawing are not necessarily to scale, emphasis instead being placed upon illustrating principles of the invention.

In the accompanying drawings.

DETAILED DESCRIPTION OF THE PREFERRED EMBODIMENTS

Figure 1:
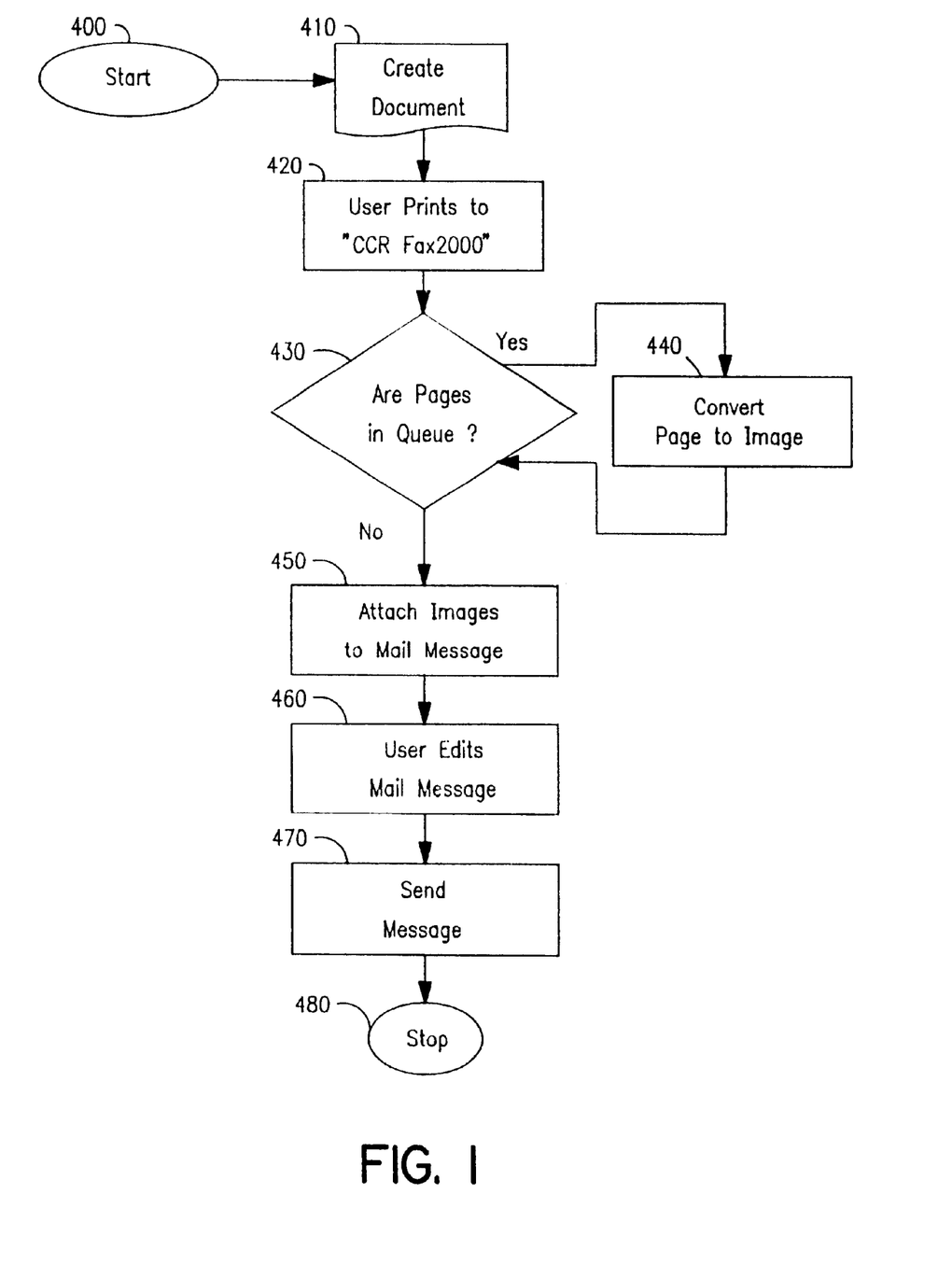
FIG. 1 is a flow diagram depicting a high level process for sending documents via attachments in an e-mail message.

Reference is made to FIG. 1, which illustrates high-level flow operation diagram. In block 410, a document is created by a user from an application software program, currently available or updated versions thereof, such as Microsoft Word™, Microsoft Paint™, Microsoft Excel™, Microsoft Access™, Quickbooks™, Peachtree Accounting™, etc. Such programs may be accounting programs, spreadsheets, traditional word processing programs (e.g. Wordperfect™), presentation software (Microsoft Powerpoint™), CAD programs, photographic images (e.g. from Microsoft Photodraw 2000™, Adobe Photoshop™ of Photodeluxe™), moving images, in varied formats uncompressed or compressed as MPEG1, MPEG4 files), and audio files, uncompressed or compressed in MP3 format. Other, more specialized programs may output forms, e.g. tax preparation software (TurboTax™, Kiplinger's TaxCut™, etc.).

When the user wishes to transmit an electronic file, such as an image (e.g a document, picture static image or moving image and/or associated audio file) of the document from within the application software program to one or more recipients, he or she selects the print option in the application software program and chooses "CCR Fax2000" driver, which is a custom printer driver according to an embodiment of the present invention, as shown in block 420. The document, which may include one or more pages, is place in a queue, such as in block 430, for conversion to images, as shown in block 440. The document pages are converted to images by the software of the invention until there are no more pages to be converted. Then, in block 450, the images are attached to an e-mail message. The user may edit the mail message as shown in block 460. Once the user is satisfied with his/her message, the message is transmitted, as shown in block 470.

In another possible embodiment, the software of the invention may allow the user to edit the mail message prior to attaching the images to the e-mail message. The invention according to a preferred embodiment comprises two parts, a driver and an interface. However, the driver and the interface may be combined into an integrated module. The driver receives print data from the operating system of choice, e.g. Windows™, Linux™, Sun Microsystems JAVA™, WindowsNT™, or Apple Macintosh™, and others, then communicates the print data to the interface. The user customizes his/her message using the interface, and then the interface sends the message along with the print data to recipients.

Figure 2:
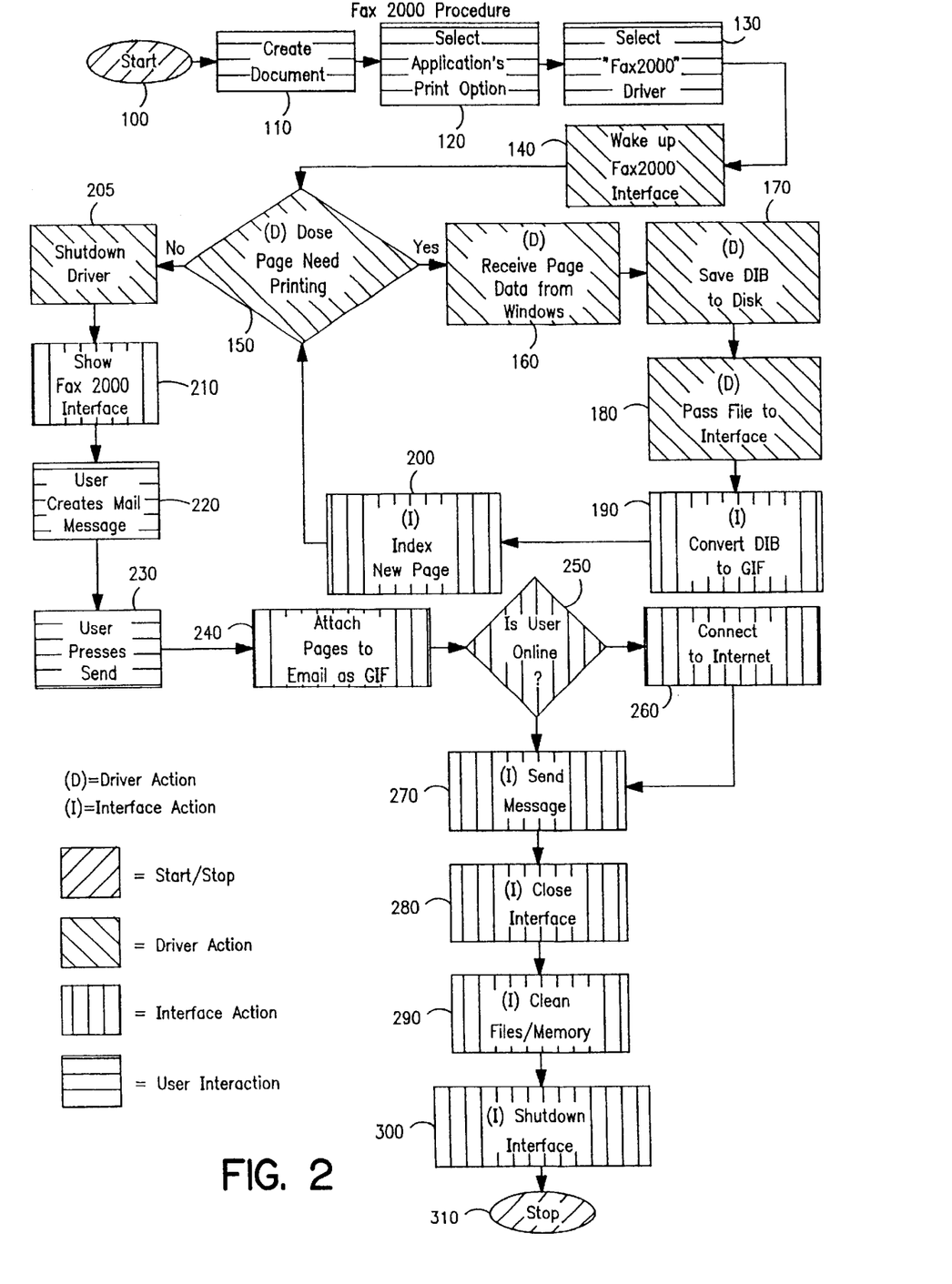
FIG. 2 is a more detailed flow diagram depicting the process in FIG. 1.
Figure 3:
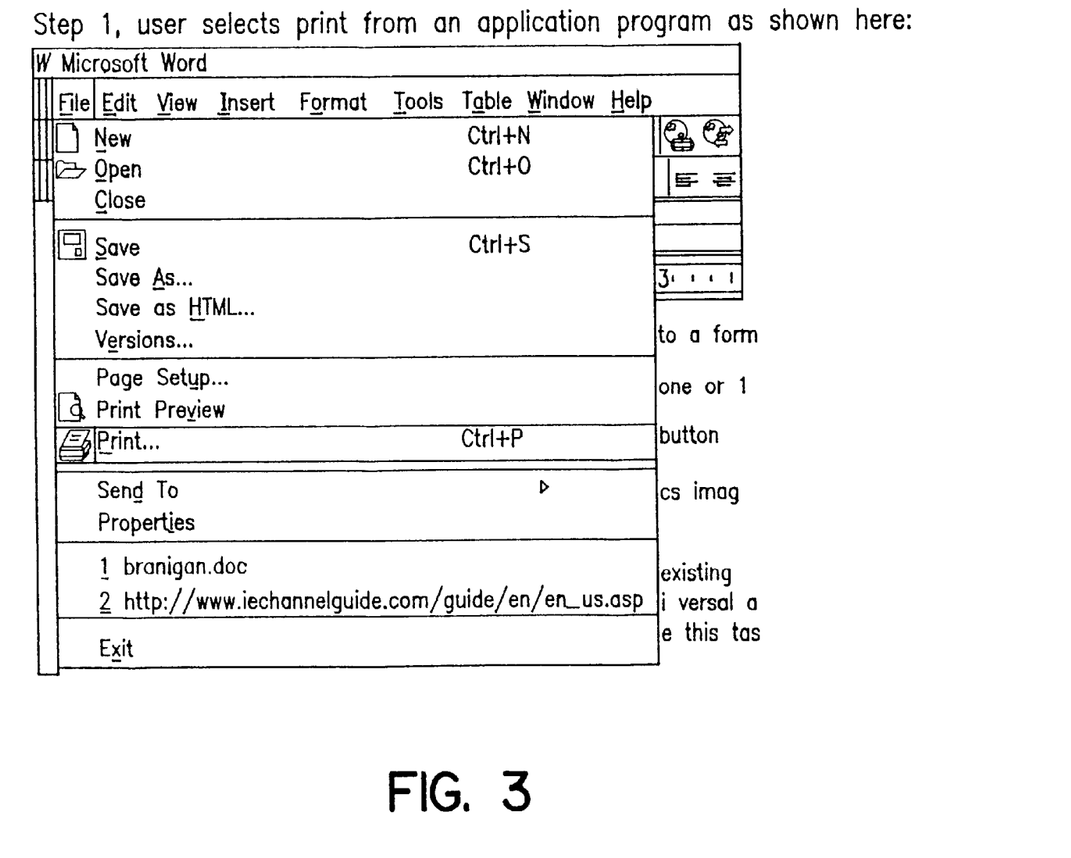
FIG. 3 is a sample screen illustrating a user selecting print option from an application program.

FIG. 2 shows a more detailed block diagram illustrating the operation of the invention according to a preferred embodiment. In block 110, a document is created by a user, using application software, such as Microsoft Word™, Microsoft Access™, Microsoft Excel™, Microsoft Paint™, TurboTax™ etc. In block 120, a print option is selected in the application when the user wishes to transmit a copy of the document to one or more recipients. A sample screen for selecting the print option is shown is FIG. 3.

Figure 4:
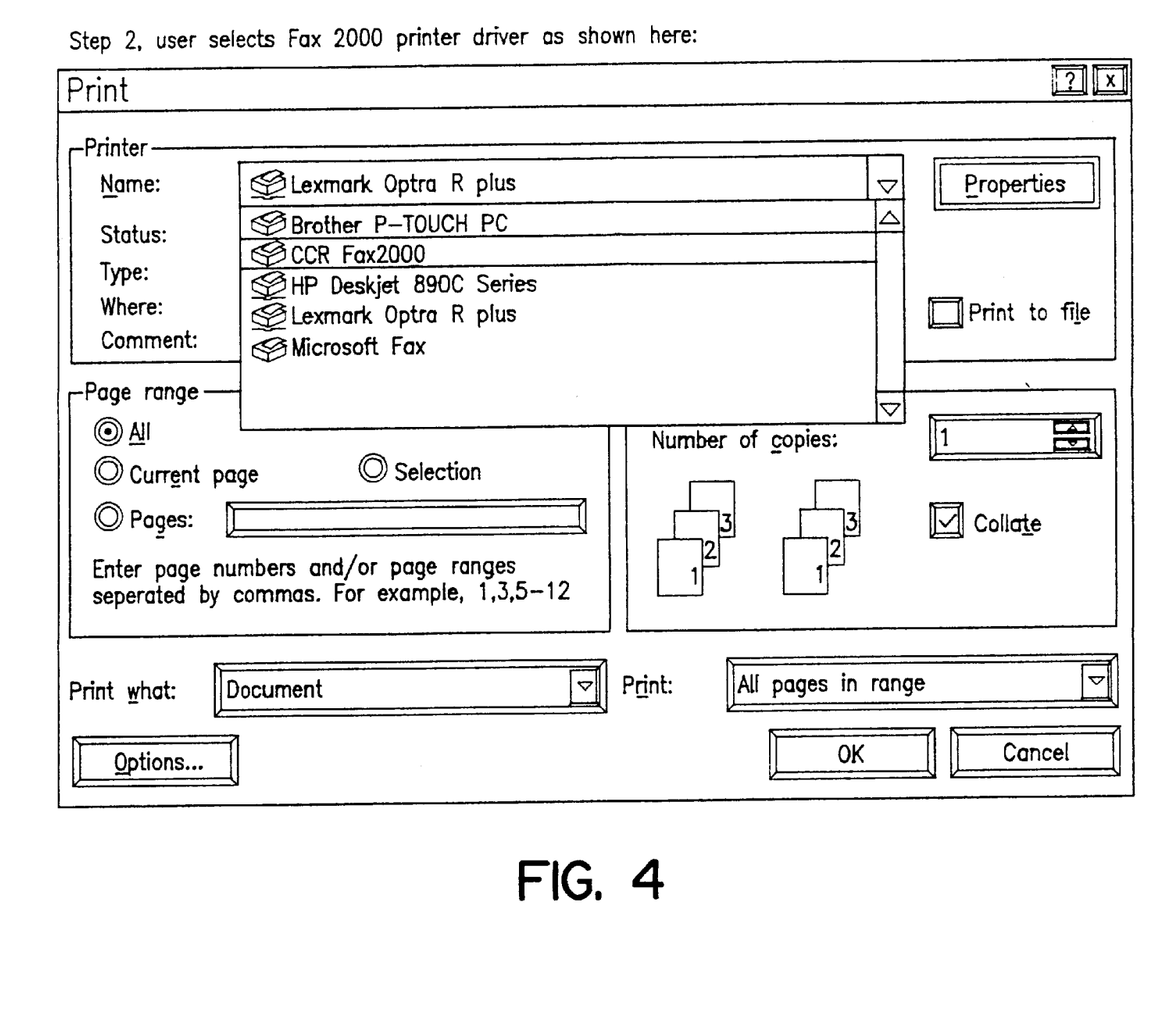
FIG. 4 is a sample screen illustrating user selecting a printer driver of the invention.

In block 130, the custom printer driver of a preferred embodiment of the present invention is selected. A sample screen of the printer driver of the invention selection is shown in FIG. 4. Upon selecting the driver, the interface is evoked as shown in block 140. In block 150, a decision is made as to whether a page is printed. If "yes", then the printer driver obtains graphical information about a page and saves it as Device Independent Bitmap (DIB) file, Graphics Interchange Format (GIF) file, Tagged Image Format (TIFF) file, or the like as shown is block 160 and 170. For different media, such as a voice mail message, an MP3 format may be used to attach the file. For photographic images, JPEG compression file formats are preferred. For video images, MPEG compression file formats are preferred.

In a particularly preferred embodiment of the present invention, an encryption protocol is provided, e.g. a 40 bit or 128 bit public-private key encryption program, which enhances the security of the transmission if a publicly available resource for transmission, e.g. the internet, is one of the selected transmission modalities.

In another particularly preferred embodiment, a control device is utilized to select the best transport device for the underlying file and notification of the intended recipient. For example, different compression files occupy varying amounts of bandwidth. If the end target of the transmission is a pager or a portable digital assistant, transmission of an uncompressed MPEG file would be inappropriate as it would not reach an appropriate display device and/or would take an inordinate amount of time to download.

The printer driver of a preferred embodiment uses standard Application Program Interface (API) and the operating system's universal printer driver dynamic link library, which is unidrv.dll in the case of Windows 95™, to obtain graphical information about the page and save it as DIB, TIFF, JPEG, etc. file.

After the page is completed, the driver notifies the interface of the invention that a page is completed and passes the filename of the DIB image on disk or other suitable memory medium, as shown in block 180. The interface then converts the DIB file to Graphics Interchange Format (GIF) in block 190. In block 200, the converted GIF file page is indexed.

Figure 5:
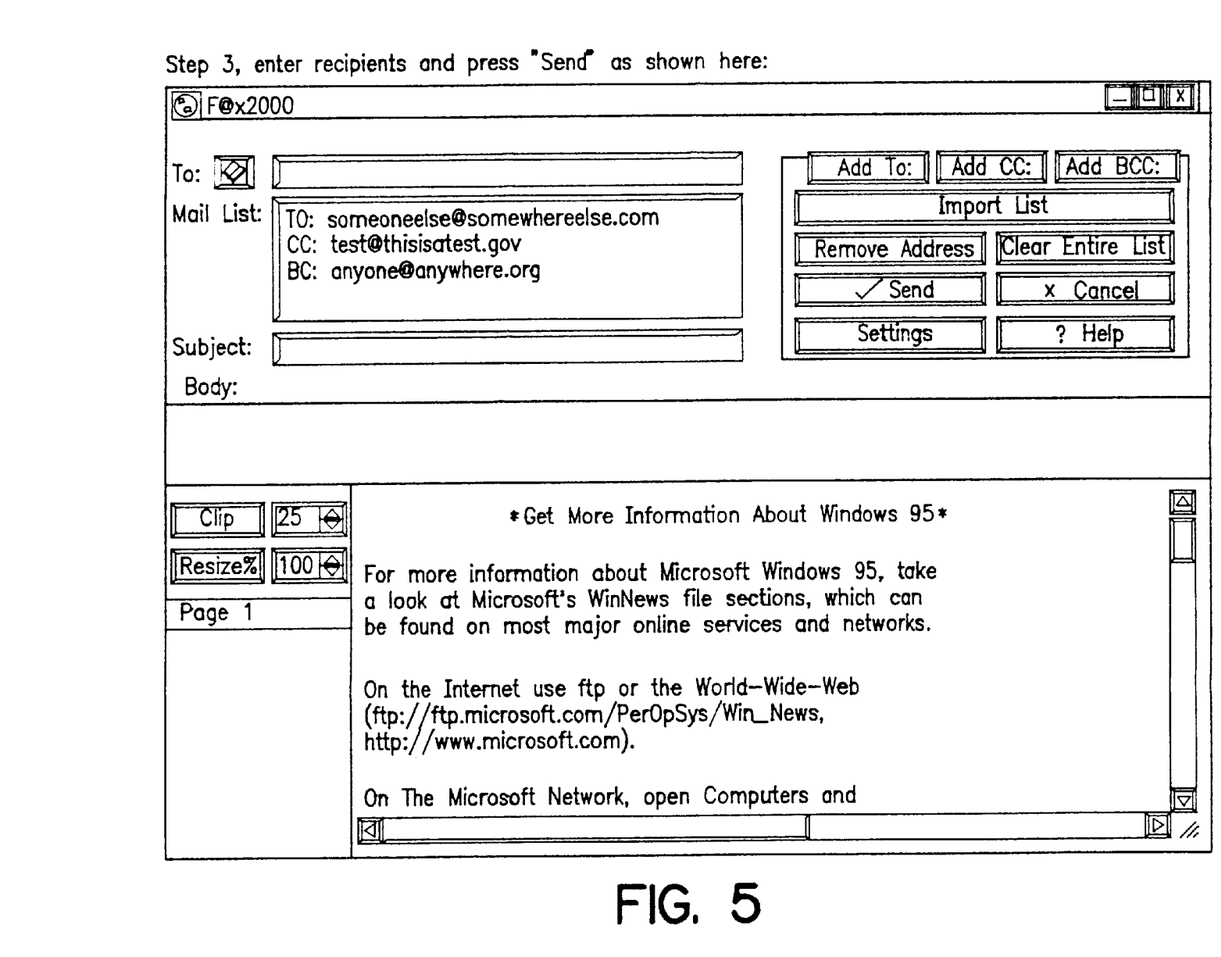
FIG. 5 is a sample screen illustrating a user entering recipients' addresses and sending a document.

Block 200 leads to the decision block 150. From the decision block 150, if "No" is returned, then block 205 shuts down the printer driver. Block 210 then shows the interface which allows the user to create mail message and/or specify e-mail addresses of recipients in block 220. A sample of the interface screen is shown in FIG. 5.

After having created a mail message, the user clicks on a "Send" button. When the software of the invention receives a "Send" command, it automatically attaches the saved pages to the mail message as GIF files. The software of the invention then optionally verifies if the user in online in block 250. If "No", then block 260 is executed to connect the PC to the Internet.

Then the operation of software of the invention continues in block 270 where the Interface actually sends the e-mail message. In block 250, if the user is already on-line, then block 270 is executed. In an optional automatic mode, once the mail is sent, block 280 initiates the closing of the Interface by cleaning up temporary files on disk/memory, as in block 290, and shuts down the Interface, as in block 300. In manual mode, the user exits the interface.

During the execution of software of the invention, all interactions between the printer driver and the interface are preferably completely transparent to the user. The software of the invention can send documents in colors to Internet e-mail addresses from a machine connected to the Internet without incurring long-distance charges. Individuals with a modem for dial up connection in their computer can use the software of the invention without having to upgrade their modem to a more expensive but limited-capability fax modem.

Compared with traditional e-mail, the software of the present invention involves few steps and utilizes the highly established GIF, DIB, TIFF, JPEG, MPEG, MP3, PCX, PNG formats, which are supported by most Internet browsers and plug in sound, movie, and image viewers. Moreover, because these formats are well established, there are viewers for virtually any operating environment, including mobile operation such as personal digital assistants, cellphones, pagers, and sound playing devices such as the MP3 player Diamond Rio™, and RIO 500™, Apple's Quicktime™, Windows' Media Player™, and Real Audio's Real Audio Player™.

The present invention can be made to be operable on a variety of computer platforms, such as Apple, Sun, or IBM-compatible personal computers (PCs), with a display, keyboard, a cursor pointer device, and a network connection means or a modem. Portable digital assistants such as the Palm™ series of PDA's from 3COM, and other commercially available PDA's. The invention according to a preferred embodiment is designed for PCs operating under Windows™ compatible environment. However, the use of extensible markup language (XML) allows the present invention to have cross-platform functionality.

Figure 6:
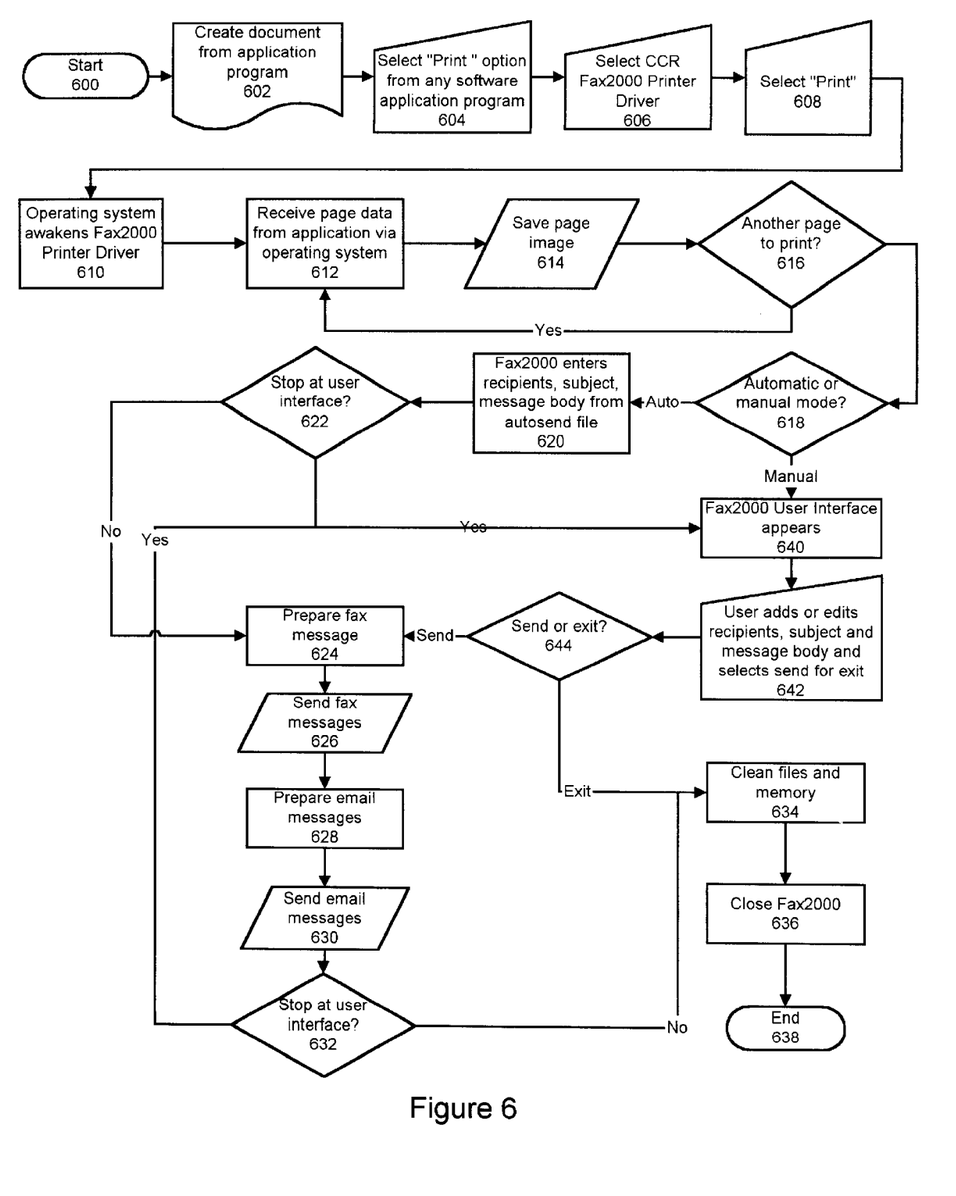
FIG. 6 is a detailed flow chart illustrating a preferred embodiment of the present invention.

Turning now to FIG. 6, the automated send features of a preferred embodiment of the instant invention may be seen. The present invention allows for the addition of fax numbers, email addresses, or other networked connections (displays, viewers, audio devices, pagers, PDA's, etc.) to a message. The addition may be automatic (e.g. a CC to file, supervisor, work group, etc.) or manual.

Start block 600 is accomplished by initiating the device from which the message is to be sent. The message may be textual, visual (moving or still image), a fax image of a document, an audio file, etc. While a PC operating in a Windows™ environment is the presently preferred embodiment, remote computing platforms outputting in various formats may be used. Laptops with network connectivity, such as an RF or IR connection to a server or through an ISP may be utilized.

For ease of reference, the term "document" is used to represent the data stream generated by the device. An appropriate application is utilized to create the image. By way of nonlimiting example, if it is a digital camera, the camera may create a JPEG or other appropriate image file format, and if desired transmit the image to a local computing device upon which the software of the instant invention is loaded. In a particularly preferred embodiment, the software is resident in the device which originally generates the document and is actuated by the issuance of a print or transmit command.

Once the print or transmit command is issued at block 604, the software which generates the document should automatically select, or give the option to select, the printer driver of the instant invention at block 606 and then the print option may be selected at block 608.

The operating system then "awakens" or initiates the software of the present invention by starting the printer driver at box 610. "Printer driver" as used herein does not strictly refer to a printer, but is meant in the broad sense of any output preparing device which prepares a file for transfer to another device or remote location.

The application which created the "document" then transfers its data to the software of the instant invention as shown in block 612 through the operating system. The software of the instant invention then saves the "page" (or audio, visual, graphical file, etc.) file as an image or other appropriate file format as in block 614. To accommodate the situation where multiple files are present, e.g. several pages, images, worksheets or spreadsheets, the software queries for additional files or pages at 616 until a "no" response is received. If a "yes" response is received, blocks 612 and 614 are repeated until a "no" response is received.

In a preferred embodiment of the present invention, the automatic or manual mode may be selected at block 618. If the "document" is, e.g. a test result from a piece of equipment which needs to go to a panel of experts, or a photograph which must be routed for departmental approval, an automatic send may be selected such that one, or a group of recipients in a single mode send or a multiple mode send are selected to receive the "document" in a format suitable for the transmission destination.

For example, many copiers and fax machines are digitally-compatible and capable of receiving and printing image files from various formats. Thus, an image file is not restricted to being sent to an email destination which ends in a PC or computer. For example, a conference room may be equipped with an MPEG projector and networked in connectivity with the application which creates the "document". Thus, if the automatic mode is selected, the software according to the instant invention may enter the recipient, subject, and a message along with the document file at block 620.

To accomplish this, an automatic initialization file lists the recipients, gives a header, message body and file information, and gives the addressing information for the message. An exemplary program file to accomplish this is as follows:

[Mail]
Recipcount=3
Subject: Autotest message
Body: Message text goes here
[Recipients]
Recip1=TO: someone@somecompany.com
Recip2=CC: patentdept@somecompany.com
Recip3=FX: 1-555-111-1121
[Other]
Deleteaftersend=1
StopatUserInterface=1

Thus, a file as listed above would send to three recipients, having 2 email addresses and a fax number. It may be seen by one of skill in the art, having regard for this disclosure, that other addresses may be contemplated, e.g. VD: 1-800-555-5555 for an output to a modem capable video device in MPEG4 format, or PD: videoprojector4@hitechcompany.com for a networked projecting device.

The text for the message subject is placed in the subject line, and a message can be placed in the body line. Thus, the software according to the instant invention properly and automatically routes the message in an appropriate format to a selected end recipient device.

Box 622 can be preselected to return the program to the user interface to add or edit recipients, or to check before an automatic send function is undertaken. If the setting is to automatic send, it enters the "Send" cascade represented by boxes 624, 626, 628, 630, and 632. "Fax" means, broadly and expansively, the sending of an electronic file document, in text, image, sound, or other format. Likewise, "E-mail" includes, but is not limited to, traditional email formats, whether over the internet or LAN based systems.

If the software according to the instant invention is set to automatically exit, the process proceeds to box 634 where the files and memory are cleared, then to box 636 where the software according to the present invention is shut down, and ends at box 638.

If a larger degree of user control over the process is desired, the program maybe set to return to the user interface 640 at various points, e.g before the recipients are selected by the user in box 642, after collecting the "print" images in box 616, after the message form is auto filled out at box 622, before the document enters the send cascade at box 624 or is aborted at box 644.

Figure 7:
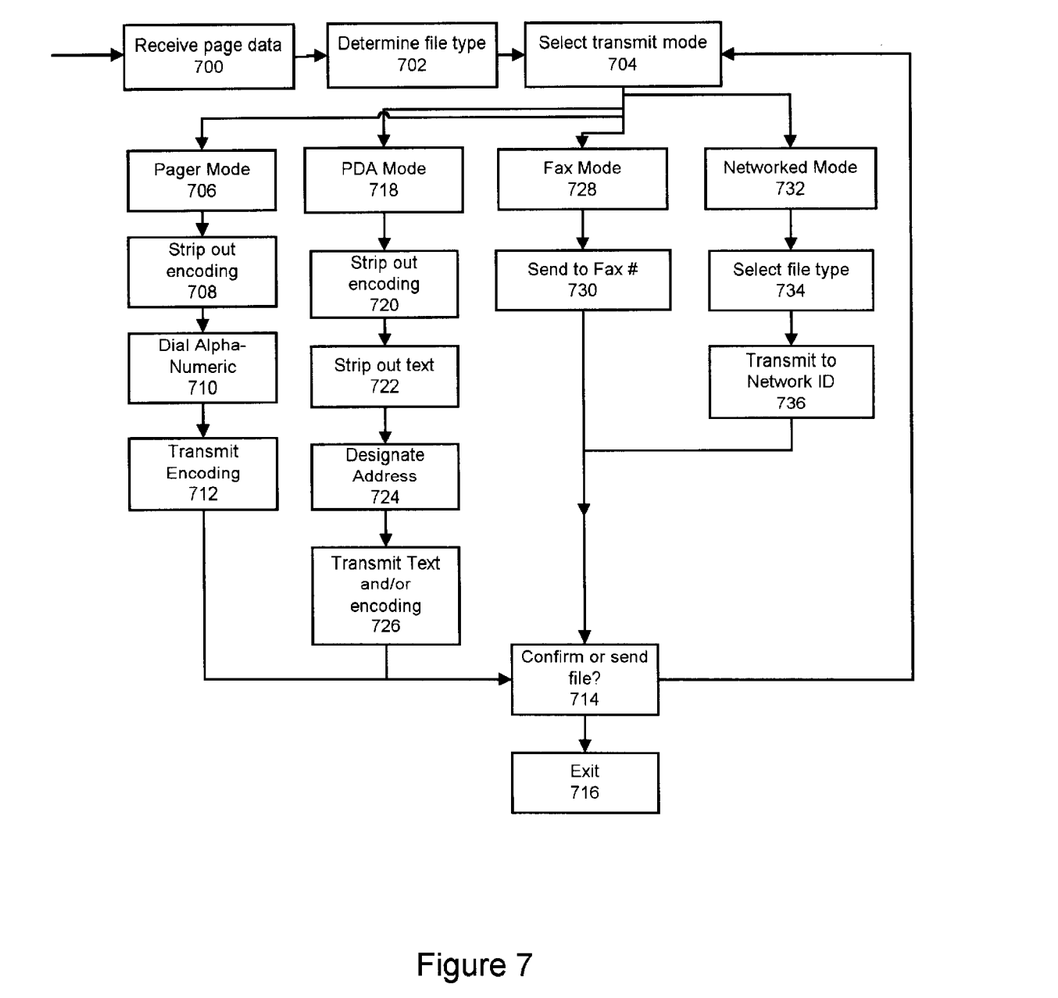
FIG. 7 is a flow chart diagram illustrating a preferred embodiment of the present invention.

Turning now to FIG. 7, a particularly useful mode of operation of the present invention is disclosed. As bandwidth or confirmation of transmission is of concern to many mobile operations or to certain document transport modalities, the send cascade can be optimized to ensure delivery or bandwidth conservation.

In block 700, the "page" data is received into the software of the present invention. The software determines what type of file it is, for example a Wordperfect™ file will have the file extension *.wpd, while a JPEG image file will have the extension *.jpg. A word processing document will certainly be transmittable to a fax or email address, but for purposes of notification of confirmation of delivery, a transmission of less bandwidth might be desired to a pager or PDA identifying the file type, source, and location of a transmitted copy for future pickup.

By way of nonlimiting example, a lengthy text document is to be transmitted to a client. Box 704 determines that it can be sent, to this client, by email and it directs an email to the networked mode 732 by attaching an email address to thee appropriate *.wpd file 734 with a message if desired and transmits it accordingly 736. However, for the selected client, it may, by way of example, be known that the client is traveling and has requested notification of the document.

Box 704 then initiates the PDA mode, as it is known that the client carries a personal digital assistant with messaging connectivity. The document encoding (author, size, date, etc.) is stripped out 720, and selected text is stripped out of the document 722. This information is then encoded with an appropriate PDA address 724 and transmitted 726. Thus, the traveling client may be informed that a document awaits inspection at a given address and be informed of the nature and perhaps the first paragraph of the document, without overwhelming the sometimes limited memory of a PDA or the remote link, be it telephone, IR, or RF.

Similarly the pager mode 706 may be actuated. The document encoding may be stripped out 708 and formatted with any other desired information, e.g. document location, size, etc. An alphanumeric display capable device, such as a pager or cellular phone with alphanumeric display capability may then be selected and dialed 710 and the information transmitted 712 to that device.

Once a particular modality of sending (e.g. fax, 728, 730) is completed, the program asks itself if a notification is desired or an alternative file transmit to be undertaken. If so, the appropriate modality is selected and the transmit function is accomplished.

If all desired transmit functions are completed, the program then may proceed to exit.

Given the proliferation of viruses and the question of document alteration, a preferred image-based document transmission according to the present invention prevents the transmissions of sometimes harmful macros which may contain viruses, and prevents the alteration of the underlying document (which is image based rather than a textually coded document) to enhance document security.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A method for transmitting an electronic document containing text and an electronic file generated from an electronic device by a user, wherein the electronic device is connectable to a computer system having a display, a processing unit, memory devices, data input devices, and network connection means, said method comprising:

detecting the selection of a file output by the user of the electronic device,     invoking a driver to produce the file output when selected;

invoking an interface;

obtaining information about said file output to be outputted;

using said driver to save said file output in a conventional file format;

passing said saved file output to said interface;

indexing said saved file output;

repeating said detecting step until there are no more files to be outputted;

shutting down said driver;

displaying said interface;

prompting the user for an address and a message;

verifying the conventional format of the one or more outputted files is appropriate for said address, detecting a send command from the user;

attaching said one or more verified outputted files to said message; and transmitting said message.

2. The method for transmitting an image as claimed in claim 1, wherein the step of prompting the user for an address further comprises the step of prompting the user to edit an e-mail message.

3. The method as claimed in claim 1, wherein the step of verifying further comprises obtaining information about an electronic device at said address, and comparing the conventional file format to a list of those known to be acceptable to the electronic device.

4. The method as claimed in claim 3, further comprising the step of converting the conventional file format to an acceptable file format.

5. The method as claimed in claim 1, further comprising closing said interface when said message is transmitted, wherein closing said interface includes cleaning up said files and the memory.

6. The method as claimed in claim 5, further comprising the step of returning the user to the application software program.

7. The method as claimed in claim 1, wherein the electronic device is a camera, copier, fax machine, audio recording device, or automated testing device.

8. The method as claimed in claim 1, wherein the attached message includes a cross-platform machine language readable by different types of electronic devices or systems.

9. The method as claimed in claim 8, wherein the language is JAVA or XML.

10. A method for transmitting an image converted from a data block formatted according to a first standard and containing information generated from a computer-application software program running on a computer and for sending a representation of said image via electronic mail to at least one e-mail address specified by a user, said method comprising:

a detecting a user-selected printer driver;

transferring said data block to said user-selected printer driver;

converting said data block in said selected printer driver to one or more image representation;

attaching said one or more image representation to an e-mail message;

prompting said user for an e-mail address; and causing said e-mail message to be sent to said e-mail address.

11. The method of claim 10 including the step of verifying that said image representation is compatible with said e-mail address; and causing the verified image representation to be sent to said e-mail address.

12. The method of claim 11 wherein said step of causing the verified image representation to be sent to said e-mail address includes the step of delivering said e-mail message to the internet for subsequent delivery to said e-mail address.

13. The method of claim 11 wherein said step of identifying said image representation includes the steps of determining the type of file to be accepted by said e-mail address and converting said image representation into the accepted file type.

14. The method of claim 10 wherein the conversion of said data block includes the generation of a Device Independent Bitmap (DIB), Graphical Interchange (GIF), JPEG, PCX, JPEG, PNG, or Tagged Image File (TIFF) format.

15. The method of claim 10 including the step of adding a text message to said e-mail message.

16. The method of claim 15 wherein said e-mail message includes XML encoding.

17. The method of claim 10 wherein said first standard is compatible with a video file, an audio file, a text file, a graphical file, or a data file.

18. The method of claim 10 wherein said data block is compressed.

19. The method of claim 10 including the step of compressing an image representation.

* * * * *